Nov. 10, 1953 K. F. G. WIEMER 2,658,948

METHOD OF AND APPARATUS FOR TRANSMITTING AUDIO MESSAGES

Filed Nov. 8, 1951 2 Sheets-Sheet 1

INVENTOR:
KURT F. G. WIEMER
BY [signature]
ATTORNEY

INVENTOR:
KURT F. G. WIEMER
BY [signature]
ATTORNEY

Patented Nov. 10, 1953 2,658,948

UNITED STATES PATENT OFFICE 2,658,948

METHOD OF AND APPARATUS FOR TRANSMITTING AUDIO MESSAGES

Kurt Franz Gustav Wiemer, Bad Toelz, Germany

Application November 8, 1951, Serial No. 255,361

26 Claims. (Cl. 179—1.5)

This invention relates to a method and an apparatus for transmitting audio messages, in particular telephone messages, either over wire or by wireless propagation, in coded, i. e., distorted form.

It is an object of this invention to provide a method and an apparatus for transmitting audio messages in such a manner that electric signals derived from the undistorted message are in distorted form while in transit from the sender to the intended receiver of the message.

It is another object of this invention to provide an apparatus for transmitting audio messages in coded form which is free of any parts which have to move, or to be moved, during the transmission of the message.

A further object of the invention is to provide an apparatus for transmitting audio messages within a transmission band width of not substantially more than about 4000 C. P. S. so as to be capable of being connected to any existing telephone line.

A further object of the invention is to provide an apparatus for transmitting audio messages in coded form which can be operated by any layman, thereby rendering unnecessary at either the sending sation or the receiving station the presence of a skilled technician while the message is being transmitted.

A further object of the invention is to provide an apparatus for transmitting audio messages in coded form wherein, apart from the manual selection of the keys which control the kind of distortion of the signals to be transmitted, the entire apparatus is automatically controlled by electronic means.

Still a further object of the invention is to provide an electronic apparatus for transmitting audio messages in coded form wherein the coding (distortion) of the message is brought about at the place where the original audio message is supplied to the apparatus and said distortion is maintained until the coded message reaches the place where it is to be received in decoded form.

Another object of the invention is to provide a method and apparatus for transmitting audio messages in coded form wherein the lag which is required between the time the message is given to the apparatus at the sender station and the time this message is received at the receiving station in order to allow for the coding of the message at said sender station and for the decoding of it at said receiving station, is below 250 milliseconds, e. g. 120 milliseconds.

A further object of the invention is to provide an apparatus for transmitting audio messages in coded form having an extraordinarily high number of easily and freely selectable as well as changeable coding possibilities (keys).

A still further object of the invention is to provide a method and apparatus for transmitting audio messages in coded form whose rigidity against decoding by an unauthorized person is in the order of about $10^{16}$ so as to be, from a practical point of view, beyond the possibility of unauthorized decoding.

In any system supposed to enable the transmission of audio messages, e. g. telephone messages, in coded form between two stations X and Y in both directions, two devices are required at the station X as well as at the station Y, one of the two devices at each station performing the coding of the outgoing messages and the other the decoding of incoming messages. Proper communication between any such two stations X and Y is possible only if the four above mentioned devices at the two stations operate in synchronism. The present invention has for a further object the assurance of perfect synchronism between the coding and decoding devices of any two stations brought into communication with each other by coordinating the operation of these devices through purely electronic controls.

A further object of the invention is to provide a method as well as an apparatus for transmitting audio messages in coded form, both said method and apparatus being based on an adaptation of the charge storage principle used in television cathode ray camera tubes. According to the present invention a distorted charge image of a sequence of audio signals is formed on a first image plate of a storage cathode ray camera tube by scanning this image plate in one direction by a first electron beam modulated in accordance with said sequence of audio signals; the charge image so produced is then scanned by a second electron beam in a direction which is perpendicular to the scanning direction of the first mentioned electron beam whereby the differently charged elements of the charge image plate are caused to produce varying secondary emission currents, which are applied to a third electron beam. This third beam is made to scan a second image plate in step with the scanning of the above mentioned first image plate by the second electron beam so as to form on said second image plate another distorted charge image of the sequence of audio signals being transmitted. This distorted charge image is restored to an undistorted charge image of the sequence of audio signals by scanning the distorted charge image by a fourth electron beam in step with the scanning of the first image plate by the first electron beam.

A further object of the invention resides in the coordination of two image plates to the just mentioned first and second electron beams, and of two image plates to the third and fourth electron beams, the two electron beams coordinated to either pair of image plates being periodically shifted from the one plate of the pair to the respective other.

A further object of the invention is to provide means for controlling independently of each other the sequences in which the scanning lines to be traced by the first electron beam and the scanning lines to be traced by the second electron beam are to follow each other.

A further object of this invention resides in the provision of an apparatus for transmitting audio signals in coded form wherein the timing of the operations of the sending station as well as the timing of the operations of the receiving station are controlled by elements of the sending station.

A still further object of this invention is to provide a plurality of resistors of different resistance values for influencing the deflecting voltages controlling the amount of shift of the above mentioned first electron beam after the scanning of each individual scanning line and another plurality of resistors for similarly influencing the amount of shift of the above mentioned second electron beam after the scanning of each individual scanning line, together with at least one manually operable selector for selecting the order in which each of these resistors is to come into play.

Further objects and advantages of the invention will appear as the description proceeds, reference being had to the accompanying drawings in which.

Figure 1:
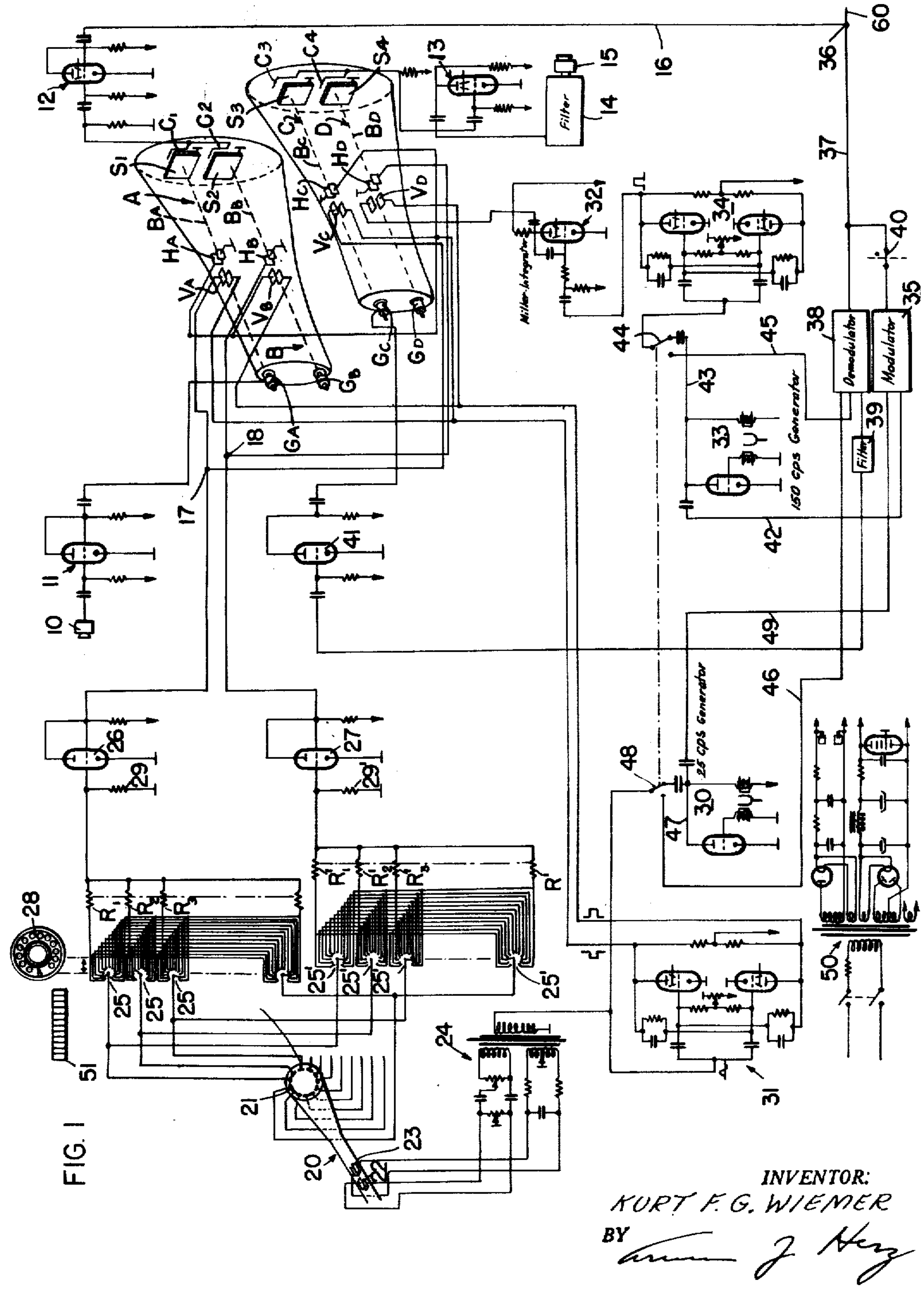
Fig. 1 shows a circuit diagram of an apparatus having a sending portion and a receiving portion.

The reference numeral 10 denotes a microphone into which the message to be transmitted in cryptographed or coded form is spoken. The sound signals are transformed by the microphone 10 into electric signals which are fed to the input side of an input amplifier 11, indicated in the drawing by a single amplifier tube even though the amplifier may have a plurality of stages.

The amplified microphone signals are supplied to an electron gun $G_A$ of a cathode ray system A which, in addition to this electron gun, includes vertical deflecting means $V_A$ and horizontal deflecting means $H_A$. The electron beam $B_A$ produced by the electron gun $G_A$ may be controlled so as to operate on one or the other of two image screens $S_1$ and $S_2$. A second electron gun $G_B$ belongs to a cathode ray system B which, in addition to the electron gun $G_B$, includes vertical deflecting means $V_B$ and horizontal deflecting means $H_B$. The gun $G_B$ produces an electron beam $B_B$ which, like the electron beam $B_A$, may operate on one or the other of the two image screens $S_1$ and $S_2$. Coordinated to the image screen $S_1$ is a collecting electrode $C_1$ and to the image screen $S_2$ a collecting electrode $C_2$. The electrodes $C_1$ and $C_2$ are connected in parallel to the input side of an output amplifier 12, again indicated in the drawing by only one of the several tubes this amplifier may have.

Each of the image screens $S_1$ and $S_2$ serves a purpose substantially similar to that for which the image plate of a television camera tube operating on the storage principle, such as the mosaic plate of an iconoscope, is provided. In such a television storage camera tube, the picture to be televised, which reaches the image plate of that tube by optical means, causes on this image plate the establishment of a charge image. Each point of the charge image corresponds to a point of the optical image and the magnitude of the electrostatic charge of each such point of the charge image corresponds to the light intensity of the coordinated point of the optical image. When this charge image is scanned by an electron beam, each point of the charge image releases secondary electrons in a number which is proportional to the charge the point being scanned possesses. The emitted secondary electrons are collected by a collecting electrode to furnish a signal current to an output circuit.

According to the present invention there are being created on the two image screens $S_1$ and $S_2$ in continuous succession distorted charge images of subsequent chains of acoustical signals. Each such distorted charge image is produced by the action of the electron beam $B_A$ upon the image screen $S_1$ or $S_2$. Since the electron gun $G_A$ of the cathode ray system A, which produces the beam $B_A$, is supplied with the amplified microphone signals, said beam $B_A$ is modulated by the microphone signals. The beam $B_A$ is moved by its coordinated deflecting means $V_A$ and $H_A$ over the selected image screen $S_1$ or $S_2$ along a plurality of parallel scanning lines which may extend either in vertical or in horizontal direction. The electron beam $B_A$ is focused so as to form at its impinging end a spot of about 0.2 millimeter in diameter. For simplifying the explanation, let it be assumed that the electron beam $B_A$ is to scan the image screen $S_1$ along twelve horizontal scanning lines. The order in which the electron beam $B_A$ is made to trace the horizontal scanning lines can be varied at will, by means to be described later, not only at the start of each telephone message or conversation to be transmitted but also at any time during the transmission of such message or conversation. Considering a single horizontal tracing of the screen $S_1$ by the beam $B_A$, the latter will cause at each point of this tracing an electrostatic charge on the screen $S_1$ proportional to the amplitude of the coordinated microphone signal. One horizontal scanning line having so been traced, the beam $B_A$ is first moved vertically to the position of another of the twelve horizontal scanning lines and then horizontally along this scanning line. After all the twelve horizontal scanning lines have been scanned on the screen $S_1$ by the electron beam $B_A$, a charge image of all the acoustic signals transmitted during the time it took to scan the screen $S_1$ in horizontal direction has been produced on that screen. At this stage of the transmission the information contained along each horizontal scanning line is in the same order as were the corresponding sound signals but the order in which the horizontal scanning lines follow each other is different from the order in which the groups of acoustic signals corresponding to each of these scanning lines follow each other in the original acoustic message. Under the above made assumption of twelve horizontal scanning lines the variability of the vertical order of these lines is 12!, or approximately $5\times10^8$.

Upon the completion of a charge image covering the entire surface of the screen $S_1$ and corresponding, in a distorted sequence, to a certain portion of the audio message to be transmitted by the action of the beam $B_A$, the latter is shifted from the screen $S_1$ to the screen $S_2$, whereas the beam $B_B$ is shifted from the screen $S_2$ to the screen $S_1$. At the time of this shift the screen $S_2$ carries no charge image, it being at its equilibrium potential as will be explained presently. The beam $B_A$ now causes on the screen $S_2$ the formation of a charge image of the following portion of the audio message to be transmitted. In the meantime the charge image previously created on the screen $S_1$ by the beam $B_A$ is being scanned by the beam $B_B$ moved along vertical lines of which there may again be twelve. Each time the beam $B_B$ moves along one of these twelve vertical scanning lines it strikes twelve points of the screen $S_1$ which have previously been charged to different potentials by the action of the horizontally scanning beam $B_A$. Upon hitting one of these twelve points after the other the beam $B_B$ causes therefrom the emission of secondary electrons in a number depending on the potential each such point has prior to its being scanned by the beam $B_B$. These secondary electrons are collected by the collecting electrode $C_1$ and supplied to the output amplifier 12. The points of the screen so being scanned by the beam $B_B$ become thus discharged one after the other to a certain equilibrium potential, e. g. zero potential, and when the beam $B_B$ has scanned all the twelve vertical lines the entire screen $S_1$ is restored to its equilibrium potential and ready to receive new charges, i. e. the charge image of the next series of acoustic signals.

The time in which the beam $B_A$ scans either the screen $S_1$ or the screen $S_2$ along twelve horizontal lines as well as the time in which the beam $B_B$ scans each of those screens along twelve vertical lines may be chosen in the order of 40 milliseconds. After each 40 millisecond period both beams $B_A$ and $B_B$ are switched from the screen on which each just operated to the respective other screen. Both beams are focussed to the same spot size, mentioned before to be 0.2 millimeter in diameter, but the energy of the two beams is preferably different.

The scanning of the screen $S_1$ first in one direction by the beam $B_A$ along twelve lines and then, again along twelve lines, by the beam $B_B$ in a direction perpendicular to the scanning direction of the beam $B_A$, subdivides the surface of the image screen $S_1$ into 144 points.

It will be observed that in regard to both image screens $S_1$ and $S_2$ it is the electron beam $B_A$ which inscribes them with the electrostatic charges of unequal magnitude and the electron beam $B_B$ which causes the screen elements of varying potential to return to a uniform equilibrium potential. The beam $B_A$ may, therefore, be called the "inscribing" beam, and the beam $B_B$ the "erasing" beam.

The cathode ray systems A and B together with the image screens $S_1$ and $S_2$ form part of the sending portion of the apparatus. The apparatus further includes a receiving portion which is similar to the sending portion insofar as it also uses two cathode ray systems, denoted as C and D, and two image screens, denoted as $S_3$ and $S_4$. The cathode ray system C comprises an electron gun $G_C$, vertical deflecting means $V_C$ and horizontal deflecting means $H_C$. The cathode ray system D includes an electron gun $G_D$, vertical deflecting means $V_D$ and horizontal deflecting means $H_D$. The electron beam produced by the electron gun $G_C$ is denoted as $B_C$ and the electron beam produced by the electron gun $G_D$ as $B_D$. Coordinated to the image screen $S_3$ is a collecting electrode $C_3$ and to the image screen $S_4$ a collecting electrode $C_4$. The two collecting electrodes $C_3$ and $C_4$ are connected in parallel to the input side of an output amplifier 13, which may have any desired number of stages but is again symbolized in the drawing by a single tube. The output side of the amplifier 13 is connected across a filtering device 14 for 3.2 kc. to a telephone receiver or loud speaker 15.

The electron gun $G_C$ of the cathode ray system C receives, either through wireless communication or, as shown in Fig. 1, through a wire connection 60, to which the output of the amplifier 12 is connected at 36 by means of a line 16, the electric signals coming from the output end of the sending side of another apparatus which is a duplicate of the apparatus just described. In Fig. 1 the sending portion of the apparatus is shown connected by the lead 16 to the receiving portion of the same apparatus. Ordinarily the transmission will, of course, take place between two remotely situated apparatuses with the sending portion of either apparatus connected or connectable to the receiving portion of the respective other apparatus. The function of the receiving portion of the apparatus will, however, be readily understood by reference to the illustration of Fig. 1. Due to the connection 16 the electron beam $B_C$ produced by the electron gun $G_C$ is modulated in accordance with the varying secondary emission currents from the elements of the image screen $S_1$ or $S_2$ being scanned by the electron beam $B_B$. The electron beam $B_C$ is moved in synchronism with the erasing beam $B_B$ and, consequently, a charge image is developed on the screen $S_3$ or $S_4$ which corresponds to the varying secondary emission currents from that screen $S_1$ or $S_2$ on which the erasing beam $B_B$ is operating. The charge image created on the screen $S_3$ or $S_4$ by the beam $B_C$ is a greatly distorted charge image of the sequence of acoustic signals originating at the microphone 10 of the sending station. In order to reconvert this distorted charge image at the receiving station to a sequence of audible signals substantially identical with the sequence of audible signals spoken into the microphone 10, the distorted charge image produced by the beam $B_C$ is scanned by the electron beam $B_D$ in synchronism with the scanning movements of the inscribing electron beam $B_A$. This scanning of the charge image by the beam $B_D$ leads to varying secondary electron emissions from each of the 144 elements of the image screen $S_3$ or $S_4$ on which the beam $B_D$ operates and these varying secondary emission currents are collected by the coordinated collecting electrode $C_3$ or $C_4$. From here these currents are supplied, as has been mentioned, via the output amplifier 13 to the telephone receiver or loudspeaker 15.

The deflecting means V and H of the four cathode ray systems, A, B, C and D of each apparatus are interconnected in the manner shown in Fig. 1. In particular, it will be noted that one plate of each of the vertical deflecting means $V_A$ and $V_C$ of the cathode ray systems A and C, respectively, is connected to a common point 17 and one plate of each of the horizontal deflecting means $H_B$ and $H_D$ of the cathode ray systems B and D, respectively, is connected to a common point 18.

20 denotes generally an electronic switch of known construction comprising a cathode ray tube and having a number of segments 21. This number corresponds to the number of scanning lines each of the electron beams $B_A$, $B_B$, $B_C$ and $B_D$ has to trace. For the example above given, in which each of the image screens $S_1$, $S_2$, $S_3$ and $S_4$ is to be scanned along twelve horizontal scanning lines and along twelve vertical scanning lines, the number of the switch segments 21 will likewise be twelve. These twelve switch segments 21 are arranged in a circle. The electron beam of the electronic switch 20 is produced by an electron gun of which only the vertical deflecting means 22 and the horizontal deflecting means 23 are shown. By means of these deflecting means 22 and 23 the electron beam can be carried to one of the twelve switch segments 21 after the other. A phase shifting device 24 applies a 25 cycle voltage to the deflecting means 22 and 23 at a phase angle difference of 90° so that one full revolution of the electron beam of the electronic switch 20 is carried out in 1/25 second-40 milliseconds. Thus, the electron beam of the electronic switch 20 complets one full revolution in the same time it takes each of the electron beams $B_A$, $B_B$, $C_C$ or $B_D$ to complete the scanning of one of the image screens $S_1$, $S_2$, $S_3$ or $S_4$.

Figure 2:
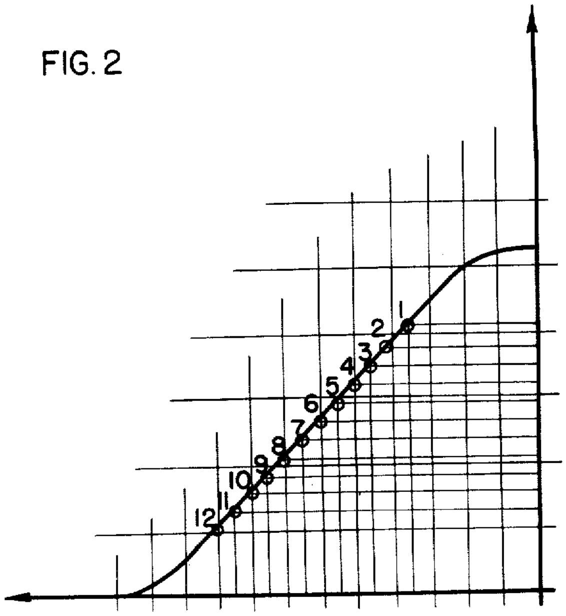
Fig. 2 shows a tube characteristic curve.

The twelve switch segments 21 are connected to the center points of two times twelve step switches or step selectors 25 and 25'. The one group of twelve step switches or step selectors 25 serves the control of the scanning line sequence of the inscribing beams $B_A$ and $B_C$ and the other group, 25', the control of the scanning line sequence of the erasing beams $B_B$ and $B_D$. Both said groups are actuated by the same electronic switch 20. Coordinated to the one group of step switches or step selectors 25 is an amplifier 26 and to the other group of step switches or step selectors 25' an amplifier 27. In each of the two groups, each of the twelve step switches or step selectors 25 comprises twelve contact points which are connected to the input grid of the coordinated amplifier 26 or 27, respectively, across resistors $R_1$, $R_2$, $R_3$ . . . to $R_{12}$ and $R_1'$, $R_2'$, $R_3'$ . . . to $R_{12}'$, respectively. Each of the step switches or step selectors has a movable contact arm by means of which any one of the resistors $R_1$ to $R_{12}$ and $R_1'$ to $R_{12}'$ can be inserted between each of the contact segments 21 and the coordinated amplifier 26 or 27. The movement of the contact arms of the various step switches can be controlled by the operation of a selector mechanism, exemplified in Fig. 1 by a twelve-hole dial 28 of a dialling mechanism. The latter is not shown in detail since it may be constructed and operated in the same manner as a conventional telephone dialling mechanism except for having the facilities for selecting a twelve digit number. By means of a change-over switch (not shown) the same dial 28 may be used for adjusting the contact arms of the twelve step switches 25 which are connectable to the amplifier 26 and for adjusting the contact arms of the twelve step switches 25' connectable to the amplifier 27. Thereby each of the contact segments of the electronic switch 20 can be placed in series with any desired one of the resistors $R_1$ to $R_{12}$ and $R_1'$ to $R_{12}'$. The so selected resistor forms with the grid leak resistor 29 of the amplifier 26 or the grid leak resistor 29' of the amplifier 27 a voltage divider of a predetermined size. If now the electron beam of the electronic switch 20 is moved in a circular path over the twelve segments 21 of said electronic switch 20, grid potentials of varying magnitude are applied to the input grid of the amplifier 26 as well as to the input grid of the amplifier 27. The voltage dividing ratios are so chosen that twelve equal voltage intervals are created, all falling within the linear part of the characteristic curve of the input tube of the amplifier 26 or 27. Consequently, there are created across the output impedance of each of these amplifiers 26 and 27 twelve voltage drops of different magnitude which voltage drops correspond to the deviating voltages necessary for moving the inscribing beams and the erasing beams to the position of the scanning line desired to be traced next. In Fig. 2 there is illustrated the above mentioned characteristic curve of the amplifier tube 26 or 27 with the twelve voltage intervals indicated thereon.

The output side of the amplifier 26 is connected to the point 17 to which one plate of each of the vertical deflecting means of the cathode ray systems A and C is connected, whereas from the output side of the amplifier 27 a connection leads to the point 18 to which one plate of each of the horizontal deflecting means of the cathode ray systems B and D is connected. Thus the adjustment of the selector 28 at the sending station determines via the amplifier 26 the twelve different vertical displacements of the horizontally scanning inscribing beams $B_A$ and $B_C$ and via the amplifier 27 the twelve different horizontal displacements of the vertically scanning erasing beams $B_B$ and $B_D$. The order in which the 144 points into which the surface of each of the screens $S_1$ to $S_4$ is subdivided by the scanning along twelve horizontal and along twelve vertical lines, and in which they are transmitted as individual impulses 25 times per second, may be varied by the selector 28 two times 12! or approximately $(5\times10^8)^2$ times. While the rigidity of a coding system against decoding is always smaller than the variability of the keys, which, as has just been stated, is $(5\times10^8)^2$, this rigidity is in the apparatus of the invention still extremely high, namely $(1.41\times10^8)^2$. With the rigidity against unauthorized decoding being thus over $10^{16}$ the apparatus of the invention is to be considered as being beyond any practical possibility of unauthorized decoding.

Both the sending station and the receiving station, each having an apparatus of the kind described (of which each in turn has a sending portion including the cathode ray systems A and B and a receiving portion including the cathode ray systems C and D) have to be set for the same twelve-digit key number agreed upon in advance of any telephone conversation between the two stations. However, this code number can obviously be changed to other twelve-digit code numbers at any point of, and as often as desired during, the conversation. These new code number or numbers may also be prearranged between the two stations tuned to each other or the request for the change may be expressed during a conversation by either one of the two persons talking at the two stations.

A control window 51 may be provided next to the dial 28 to show at any stage of the dialling operation what digit numbers have been dialled up to that point. If an error occurs at any stage of the dialling of the code number this error will show up at the window 51 so that the dial mechanism can be immediately reset to its initial position and dialling of the correct code number can be restarted.

The device 28 for selecting the sequence of the scanning lines of the inscribing beam and of the erasing beam controls these line sequences for the sending portion as well as for the receiving portion of each apparatus. While in the foregoing a dialling device has been mentioned as the means for selecting the order in which the horizontal and vertical scanning lines are to follow each other, other types of known selecting devices will suggest themselves readily to those skilled in the art. For instance, a series of adjusting wheels, as they are used in calculating machines, might be used for the selection of the twelve-digit code number.

For the proper operation of the system exact synchronism between sender and receiver is necessary. This involves also the necessity of a very high frequency constancy of the alternating voltages required for the control of the periodic operations. The frequencies of technical alternating current differ from country to country and they are furthermore not always sufficiently constant. Therefore, I do not contemplate the use of a line frequency for such control. Instead, the 25 C. P. S. alternating current required for causing the electron beam in the electronic switch 20 to cover the circular path represented by the twelve segments 21 in 40 milliseconds, is derived from a separate generator 30, such as a tuning fork generator. Since also the shifting of the inscribing beam and the erasing beam from one image screen to the other in both the sending portion and the receiving portion of the apparatus has to take place in intervals of 40 milliseconds, the control voltage therefor can also be obtained from the 25 C. P. S. generator 30. The rectangular deviating voltage (⎍) necessary in this case is supplied in a manner known per se by a modified multivibrator circuit generally indicated in Fig. 1 by the reference numeral 21.

Figure 3:
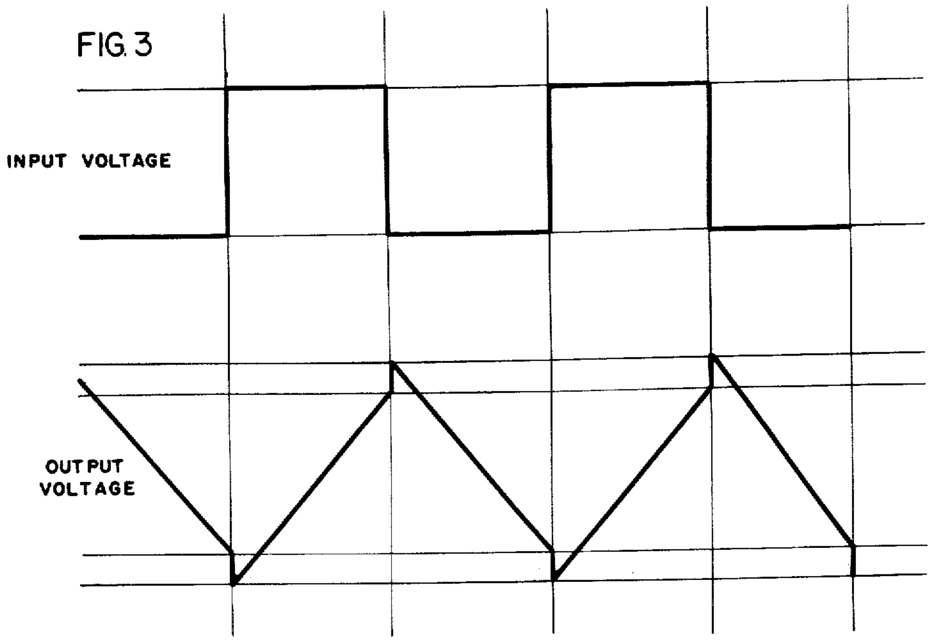
Fig. 3 illustrates the wave forms of the input and output voltages of an element of the circuit shown in Fig. 1.

For the scanning there is required a periodical (non-sinusoidal) voltage which moves each of the inscribing and erasing beams six times back and forth over that of the image screens $S_1$ to $S_4$ upon which the particular beam has been directed. Thereby there are formed by each beam twelve lines, each of a duration of about 3.33 milliseconds. Furthermore, this scanning voltage is preferably of such a nature that at the end of each line the electron beams (inscribing and erasing beams) are pushed a small distance beyond that line by an additional voltage peak. This will prevent that the beams which at this time are undergoing their line displacement smear the edges of the inscribed screen surface. A voltage which answers this requirement is obtainable from a so-called Miller integrator which is indicated in Fig. 1 by the reference numeral 32 and whose construction is well known. The output potential of such a Miller intergrator is proportional to the time integral of the input voltage. By using rectangular impulses for the control of the Miller integrator the above described scanning voltage having additional peaks is obtained. The upper portion of Fig. 3 shows the rectangular input voltage controlling the Miller integrator and the lower portion the substantially triangular (saw-tooth) output voltage which at each of its maximum and minimum points has an additional peak. These voltage peaks cause the change of the scanning lines to take place outside of the screen surfaces. To assure also in this connection perfect frequency constancy, there is used a tuning fork generator 33 of a frequency of 150 C. P. S., which in cooperation with a multivibrator 34, supplies the ( ⎍ ) impulses necessary for the control of the Miller integrator 32.

The multivibrator 31, the phase shifting device 24, the multivibrator 34 and the Miller integrator 32 at the receiving station are controlled by the generators 30 and 33 of the sending station, that is to say, the control of the entire apparatus of the sending station and of the receiving station is performed by the generators of the sending station. It will be obvious that on the sending station the 25 C. P. S. generator and the 150 C. P. S. generator must operate in synchronism. The 150 C. P. S. voltage generated in the generator 33 is modulated in a modulator 35 by the 25 C. P. S. voltage derived from the generator 30 and this modulated voltage is supplied to the point 36 which also receives over the lead 16 the electric signals corresponding to the distorted charge image produced on either the screen $S_1$ or the screen $S_2$ of the camera tube. In the connection between the modulator 35 and the point 36 there is inserted a switch 40 adapted to keep this connection closed while the image screens $S_1$ and $S_2$ are operative (sending) and to break said connection while the image screens $S_3$ and $S_4$ are operative (receiving).

From the point 36 a line 37 leads to a demodulator 38 which is connected across a filter network 39 to the input side of an amplifier 41 whose output side is connected to an electron gun $G_C$ producing the electron beam $B_C$ which, as has been described above, operates alternatively on the receiving screens $S_3$ and $S_4$. The filter network 39 contains filters for 25 C. P. S. and 150 C. P. S. to suppress hum caused by the voltages of these frequencies.

The modulator 35 is connected through a line 42 to the output side of the 150 C. P. S. generator 33 and from there a line 43 leads to a two-pole switch 44 which connects the generator 33 to the multivibrator 34 when the switch 44 is in the sending position. In the other position of the switch 44, the receiving position, the demodulator 38 is connected to the multivibrator 34 by means of a line 45. Furthermore, the demodulator 38 is connected through a line 46 to a point 47 with which a switch 48 connected to the multivibrator 31 connects when the apparatus is receiving. For sending, the switch 48 is connected with the output side of the 25 C. P. S. generator which, in turn, is connected by a line 49 to the modulator 35. The two switches 44 and 48 are interconnected so as to perform simultaneously their movements to the sending position and to the receiving position.

The above described apparatus permits perfect synchronism in the respects previously mentioned. As far as I am aware, none of the methods of transmitting coded telephone messages hitherto known has reached the degree of accuracy obtainable by the present invention or even the minimum degree of accuracy which must be demanded of a system for transmitting speech in coded form. The constancy of the best high constancy quartz generators is only $1.10^{-8}$ which is well below the calculated required constancy. The latter would be of approximately $6.5 \times 10^{-11}$ for a 24-hour operation. Since in the apparatus according to the present invention there are no movable parts to be synchronized, the tuning of the receiving station to the sending station being performed in a purely electronic way, not only the just mentioned calculated required constancy but practically absolute constancy is assured.

The power supply unit, which may be of any conventional design, is generally indicated in the drawing by the reference numeral 50.

All four cathode ray systems A, B, C and D may be enclosed in one common envelope (not shown) or, a separate sending tube comprising the electrol guns $G_A$ and $G_B$, the cathode ray systems A and B and the screens $S_1$ and $S_2$ with their collecting electrodes $C_1$ and $C_2$, and a separate receiving tube comprising the electron guns $G_C$ and $G_D$, the cathode ray systems C and D and the screens $S_3$ and $S_4$ with their collecting electrodes $C_3$ and $C_4$ may be provided, as shown in Fig. 1.

The apparatus of the invention is, as will be realized from the foregoing description, of a relatively simple construction and its size and weight need not surpass the dimensions and the weight of a medium sized or large television receiving set.

If desired, only the selector proper, such as the dialling disc 28, together with the microphone 10 and the reeciver 15, need to be situated near the person using the apparatus and these elements may be connected by a cable of any desired length to the comparatively bulky remainder of the apparatus which itself may stand remote from that person.

No frequencies higher than the speech frequencies are effective in the entire system so that the apparatus may be used in combination with any conventional wire or wireless telephone network. To send and receive the coded messages no wide frequency band cable is required, a single ordinary line being adequate for that purpose.

It will be understood that the method and the apparatus of the invention can be used not only for telephony between two stations, as has been described above, but also for simultaneous intercommunication between any desired number of stations.

While I have illustrated in the drawing and described in the foregoing specification one particular form of an apparatus (circuit) suitable for carrying out the principles of the invention, I desire it to be understood that this apparatus (circuit) has been given by way of example only and that various changes, modifications and rearrangements of the elements shown may be made without departing from the spirit of the invention or the scope of the appended claims.

What I claim is:

1. A method of transmitting audio messages, comprising the steps of producing a first electron beam, cooverting a sequence of audible signals into electrical signals, modulating said electron beam in accordance with said audible signals, guiding said electron beam for a predetermined period of time first over a first surface having charge storing properties and then for an equal period of time over a second surface having charge storing properties, thereby forming alternatively on said first and said second storing surface charge images of successive portions of said sequence of audible signals, continuing said scanning of said first and said second surface in alternating succession during the entire transmission of said sequence of audible signals, scanning in alternating succession said charge images on said first and said second surface by a second electron beam so as to cause the elements of said charge images on said first and said second surface to produce varying secondary emission currents, modulating a third electron beam by said varying secondary emission currents, scanning in alternating succession a third and a fourth surface having charge storing properties by said third electron beam in step with the scanning of said first and said second surface by said second electron beam, and then scanning said charge images on said third and said fourth surface by a fourth electron beam in step with the scanning of said first and said second surface by said first electron beam to cause the elements of said last named charge images to produce varying secondary emission currents, and reconverting the electrical signals so derived from said last named charge images into a sequence of audible signals.

2. A method of transmitting audio messages, comprising the steps of forming on a first image plate of a storage cathode ray camera tube a charge image of a sequence of audio signals by scanning said image plate in one direction by a first electron beam modulated in accordance with said sequence of audio signals, producing a second electron beam, scanning said charge image by said second electron beam in a direction perpendicular to the direction of scanning by said first electron beam so as to cause the elements being scanned of said image plate to produce varying secondary emission currents, producing a third electron beam, modulating said third electron beam by said varying secondary emission currents, scanning a second image plate by said third electron beam in step with the scanning of said first image plate by said second electron beam so as to form on said second image plate a distorted charge image of the sequence of audio signals being transmitted, restoring said distorted charge image to the undistorted charge image by scanning said distorted charge image by a fourth electron beam in step with the scanning of said first image plate by said first electron beam, and converting said restored charge image into a sequence of audible signals.

3. In a system for the transmission of audio messages in coded form between at least two stations, an apparatus at each station comprising two pairs of cathode ray systems, each of said cathode ray systems including an electron gun and vertical and horizontal deflecting means, at least one image plate having charge storing properties coordinated to each of said two pairs of cathode ray systems, control means associated with said deflecting means of each of said cathode ray systems adapted to cause the cathode ray beam produced by the electron gun of one system of each of said two pairs of cathode ray systems to move in parallel scanning lines in a first direction and the cathode ray beam produced by the electron beam of the other system of the same pair of cathode ray systems in parallel scanning lines in a direction perpendicular to said first direction, means for shifting the cathode ray beams produced by the two electron guns of each of said pairs of cathode ray systems in regular intervals onto and away from the same image plate, and selecting means associated with at least some of said deflecting means for random selection of the order in which said parallel scanning lines of at least one of said two beams generated by each of said pairs of cathode ray systems are to be traced.

4. In a system for the transmission of audio messages in coded form between at least two stations, an apparatus at each station comprising a microphone, a receiver, a first and a second pair of cathode ray systems, each of said cathode ray systems including an electron gun and vertical and horizontal deflecting means, at least one image plate having charge storing properties coordinated to each of said two pairs of cathode ray systems, an output terminal for each image plate, the electron gun of one system of said first pair of cathode ray systems being connected to said microphone and the electron gun of one system of said second pair of cathode ray systems being connected to the output terminal or terminals of the image plate or plates coordinated to said first pair of cathode ray systems, control means associated with said deflecting means of each of said cathode ray systems adapted to cause the cathode ray beam produced by the electron gun of one system of each of said two pairs of cathode ray systems to move in parallel scanning lines in a first direction and the cathode ray beam produced by the electron beam of the other system of the same pair of cathode ray systems in parallel scanning lines in a direction perpendicular to said first direction, means for shifting the cathode ray beams produced by the two electron guns of each of said pairs of cathode ray systems in regular intervals onto and away from the same image plate, the output terminal or terminals of the image plate or plates coordinated to said second pair of cathode ray systems being connected to said receiver, and selecting means associated with at least some of said deflecting means for random selection of the order in which said parallel scanning lines of at least one of the two beams generated by each of said pairs of cathode ray systems are to be traced.

5. In a system for the transmission of audio messages in coded form between at least two stations, an apparatus at each station comprising two pairs of cathode ray systems, each of said cathode ray systems including an electron gun and vertical and horizontal deflecting means, at least one image plate having charge storing properties coordinated to each of said two pairs of cathode ray systems, an integrator adapted to produce an output voltage proportional to the time integral of its input voltages, a multivibrator for supplying a rectangular input voltage to said integrator, the output end of said integrator being connected to some of said deflecting means of said cathode ray systems for causing the cathode ray beam produced by the electron gun of one system of each of said two pairs of cathode ray systems to move in parallel scanning lines in a first direction and the cathode ray beam produced by the electron gun of the other system of the same pair of cathode ray systems in parallel scanning lines in a direction perpendicular to said first direction, and selecting means associated with said deflecting means for random selection of the order in which said parallel scanning lines of at least one of the two beams generated by each of said pairs of cathode ray systems are to be traced.

6. In a system for the transmission of audio messages in coded form between at least two stations, an apparatus at each station comprising a first and a second pair of cathode ray systems, each of said cathode ray systems including an electron gun, vertical and horizontal deflecting means, at least one image plate having charge storing properties coordinated to each of said two pairs of cathode ray systems, control means associated with said deflecting means of each of said cathode ray systems adapted to cause the cathode ray beam produced by the electron gun of one system of each of said two pairs of cathode ray systems to move in parallel scanning lines in a first direction and the cathode ray beam produced by the electron gun of the other system of the same pair of cathode ray systems in parallel scanning lines in a direction which is perpendicular to said first direction, means for shifting the cathode ray beams produced by the two electron guns of each of said pairs of cathode ray systems in regular intervals onto and away from the same image plate, at least one group of selectors having one selector for each scanning line to be traced by one of said two pairs of cathode ray systems in one of said two directions, each of said selectors having a midpoint, a movable contact arm and as many contact points connectable by said contact arm to said midpoint as there are scanning lines to be traced in one of said two directions, each of said contact points being connected to one of a series of resistors having different resistance values, two electron tubes each having an input electrode and an output electrode and being each coordinated to one of said two cathode ray systems of said first pair of cathode ray systems, each of said two electron tubes having its input electrode connected to said series of resistors and its output electrode to those deflecting means of the coordinated cathode ray system which control the beam movement perpendicular to the scanning direction of that beam, an electronic switch having a plurality of switch segments each connected to one of said midpoints of said selectors and means for producing and moving an electron beam over said segments so as to cause the application of different line deviating voltages to said deflecting means of said two cathode ray systems of said first pair of cathode ray systems at the end of the tracing of each of said scanning lines, and actuating means for causing the movement of the movable contact arm of each of said selectors into contact with any selected one of the contact points of that selector.

7. A method of transmitting audio messages, comprising the steps of producing a first electron beam, converting a sequence of audible signals into electrical signals, modulating said electron beam in accordance with said audible signals, scanning a first surface having charge storing properties by said electron beam along scanning lines following each other in an order different from the order in which the audible signals follow each other in said sequence of audio signals, thereby forming on said first surface a distorted charge image of said sequence of audible signals, scanning said distorted charge image by a second electron beam so as to cause the elements of said distorted charge image to produce varying secondary emission currents, modulating a third electron beam by said varying emission currents, scanning a second surface having charge storing properties by said modulated third electron beam in step with the scanning of said first surface by said second electron beam and then by a fourth electron beam in step with the scanning of said first surface by said first electron beam, and reconverting the secondary emission currents resulting from said scannig of said second surface by said fourth electron beam into a sequence of audible signals.

8. A method of transmitting audio messages as defined by claim 7, comprising scanning said first surface by said first electron beam along parallel scanning lines and then by said second electron beam along scanning lines extending in a direction perpendicular to the scanning direction of said first electron beam.

9. An method of transmitting audio messages as defined by claim 8, comprising producing said second electron beam with an energy different from that of said first electron beam.

10. A method of transmitting audio messages as defined in claim 1, comprising moving said first electron beam first over said first surface and then over said second surface in parallel scanning lines in an order different from the order in which the audible signals follow each other in said sequence of audible signals, thereby forming alternatively on said first and said second surface distorted charge images of successive portions of said sequence of audible signals, and scanning said distorted charge images on said first and said second surface by said second electron beam along a plurality of scanning lines extending in a direction perpendicular to the direction of scanning by said first electron beam.

11. A method of transmitting audio messages as defined in claim 10, comprising synchronizing the movements of said first and said fourth beam and between said second and said third beam by applying control voltages to the deflecting means of said first beam and of said second beam only and by transmitting to said fourth and said third beam, respectively, said control voltages along with the varying secondary emission currents caused by said second beam.

12. A method of transmitting audio messages as defined in claim 10, comprising producing said second electron beam with an energy different from that of said first electron beam.

13. A method of transmitting audio messages as defined in claim 10, comprising shifting said first electron beam, after its operation for a predetermined time on said first surface having charge storing properties, said second surface having charge storing properties for operation thereon for an equal period of time, and scanning the distorted charge images on said first and said second surface by said second electron beam along a plurality of scanning lines extending in a direction perpendicular to the direction of scanning by said first electron beam.

14. A method of transmitting audio messages as defined in claim 13, comprising periodically shifting said first electron beam from the one of said first and said second surfaces to the respective other by means of a rectangular deflecting voltage.

15. A method of transmitting audio messages, comprising the steps of producing within a storage cathode ray tube having horizontal and vertical deflecting means a first electron beam, converting a sequence of audible signals into electrical signals, modulating said first electron beam by said electrical signals, scanning a first surface having charge storing properties by said first electron beam along parallel scanning lines under the influence of a deflecting voltage applied to one of said horizontal and vertical deflecting means, moving said electron beam at the end of the tracing of each of its scanning lines to another of its scanning lines by unequal deflecting voltages applied to the respective other of said horizontal and vertical deflecting means to form on said first storing surface a distorted charge image of said sequence of audible signals, producing within the same cathode ray tube a second electron beam, scanning said distorted charge image by said second electron beam along a plurality of scanning lines extending in a direction perpendicular to the scanning direction of said first electron beam under the influence of a deflecting voltage applied to said other of said horizontal and vertical deflecting means so as to cause the elements of said distorted charge image to produce varying secondary emission currents, moving said second beam at the end of the tracing of each of its scanning lines to another of its scanning lines by deflecting voltages so chosen that said last named scanning lines follow each other in selected non-consecutive order, modulating a third electron beam by said varying secondary emission currents, scanning a second surface having charge storing properties first by said third electron beam in step with the scanning of said first surface by said second electron beam and then by a fourth electron beam in step with the scanning of said first surface by said first electron beam.

16. A method of transmitting audio messages as defined in claim 15, comprising moving said first and said second electron beam, at the end of each of their respective scanning lines, beyond those lines by an additional voltage peak so that the changes from one scanning line to another take place outside of said first surface.

17. A method of transmitting audio messages as defined in claim 15, including the steps of scanning said first surface having charge storage properties by said first electron beam for a predetermined period of time, then shifting said beam by means of a rectangular deflecting voltage to a second surface having charge storing properties and guiding it over said second surface in the same manner and for an equal period of time as said beam was guided over said first surface, thereby forming alternatively on said first and said second storing surface distorted charge images of successive portions of said sequence of audible signals, repeating periodically said shifting of said beam from the one of said two surfaces to the other and said scanning of the surface to which said beam has been shifted during the entire transmission of said sequence of audible signals, scanning said distorted charge images on said first and said second surface in alternating succession by said second electron beam, scanning in alternating succession a third and a fourth surface having charge storing properties by said third electron beam in step with the scanning of said first and said second surface by said second electron beam so as to form on said third and said fourth surface charge images of successive portions of said sequence of audible signals distorted in the same manner as said charge images on said first and said second surface, and scanning said distorted charge images on said third and said fourth surface by said fourth electron beam in step with the scanning of said first and said second surface by said first electron beam.

18. A method of transmitting audio messages, comprising the steps of producing a first electron beam, converting a sequence of audible signals into electrical signals, modulating said electron beam in accordance with said audible signals, scanning a first surface having charge storing properties by said electron beam along scanning lines following each other in an order different from the order in which the several groups of audible signals, which correspond each to one of said parallel scanning lines, follow each other in said sequence of audio signals, thereby forming on said first storing surface a distorted charge image of said sequence of audible signals, scanning said distorted charge image by a second electron beam so as to cause the elements of said distorted charge image to produce varying secondary emission currents, modulating a third electron beam by said varying secondary emission currents, scanning a second surface having charge storing properties by said modulated third electron beam in step with the scanning of said first surface by said second electron beam, and scanning said second surface by said fourth electron beam in step with the scanning of said first surface by said first electron beam, and synchronizing the movements of said first and said fourth beam and of said second and said third beam by applying control voltages to the deflecting means of said first beam and of said second beam only and by transmitting to said fourth and said third beam, respectively, said control voltages along with said varying secondary emission currents caused by said second beam.

19. A system for the transmission of audio messages in coded form between at least two stations as defined in claim 3, wherein selecting means are associated with said vertical and said horizontal deflecting means for random selection of the order in which said parallel scanning lines of either beam generated by each of said pairs of cathode ray systems are to be traced.

20. A system for the transmission of audio messages in coded form between at least two stations as defined in claim 3, wherein to each of said two pairs of cathode ray systems there is coordinated a pair of image plates having charge storing projerties.

21. A system for the transmission of audio messages in coded form between at least two stations as defined in claim 5, comprising a pair of image plates having charge storing properties coordinated to each of said two pairs of cathode ray systems, and a second multivibrator for periodically supplying a rectangular deviating voltage to said deflecting means of first the one and then the other of the two systems of each of said two pairs of cathode ray systems to shift the cathode ray beams produced by the two electron guns of each of said pairs of cathode ray systems in regular intervals from one to the other of the two image plates of each of said pairs of image plates.

22. A system for the transmission of audio messages in coded form between at least two stations as defined in claim 6, comprising two groups of selectors, each group having one selector for each scanning line to be traced by one of said two pairs of cathode ray systems in one of said two directions, each of said two electron tubes being coordinated to one of said two groups of selectors and having its input electrode connected, respectively, to one of said two series of resistors.

23. A system for the transmission of audio messages in coded form between at least two stations as defined in claim 22, further comprising a dialling device for causing the movement of the movable contact arm of each of said selectors into contact with any selected one of the contact points of that selector.

24. A system for the transmission of audio messages in coded form between at least two stations as defined in claim 22, further comprising separate selecting means each associated with one of said group of selectors for independent random selection of the order in which said parallel scanning lines of the one and the other of the two beams generated by said pair of cathode ray systems are to be traced.

25. A system for the transmission of audio messages in coded form between at least two stations as defined in claim 22, further comprising an integrator adapted to produce an output voltage proportional to the time integral of its input voltages, and a multivibrator for supplying a rectangular input voltage to said integrator, the output end of said integrator being connected to some of said deflecting means of said cathode ray systems for causing the cathode ray beam produced by the electron gun of one system of each of said two pairs of cathode ray systems to move in parallel scanning lines in a first direction and the cathode ray beam produced by the electron gun of the other system of the same pair of cathode ray systems in parallel scanning lines in a direction perpendicular to said first direction.

26. A system for the transmission of audio messages in coded form between at least two stations as defined in claim 25, further comprising a second multivibrator for periodically supplying a rectangular deviating voltage to said deflecting means of first the one and then the other of the two systems of each of said two pairs of cathode ray systems to shift the cathode ray beams produced by the two electron guns of each of said pairs of cathode ray systems in regular intervals from one to the other of the two image plates of each of said pairs of image plates.

KURT FRANZ GUSTAV WIEMER.

References Cited in the file of this patent

UNITED STATES PATENTS

| Number | Name | Date |
| --- | --- | --- |
| 2,401,888 | Smith | June 11, 1946 |
| 2,543,116 | Llewellyn | Feb. 27, 1951 |